United States Patent [19]
Harato et al.

[11] Patent Number: 5,545,384
[45] Date of Patent: Aug. 13, 1996

[54] PROCESS FOR PRODUCTION OF ALUMINUM HYDROXIDE FROM ORE CONTAINING ALUMINA

[75] Inventors: Takuo Harato; Takahiro Ishida, both of Niihama; Yoshio Kumagae, Osaka; Michikazu Inami, Niihama; Kazuhisa Ishibashi, Niihama; Mitsuaki Murakami, Niihama, all of Japan

[73] Assignee: Sumitomo Chemical Co., Ltd., Osaka, Japan

[21] Appl. No.: 465,620

[22] Filed: Jun. 5, 1995

Related U.S. Application Data

[63] Continuation of Ser. No. 78,299, Jun. 25, 1993, abandoned.

[30] Foreign Application Priority Data

Oct. 30, 1991 [JP] Japan .................................. 3-284648

[51] Int. Cl.⁶ .............................. C01F 7/00; C01F 7/02; C22B 21/00
[52] U.S. Cl. .......................... 423/121; 423/122; 423/123; 423/629
[58] Field of Search .................................. 423/121, 122, 423/123, 629

[56] References Cited

U.S. PATENT DOCUMENTS

| | | | |
|---|---|---|---|
| 2,107,919 | 2/1938 | Turner et al. | 423/123 |
| 3,413,087 | 11/1968 | Roberts | 423/123 |
| 3,497,317 | 2/1970 | Tusche | 423/123 |
| 3,716,617 | 2/1973 | Oku et al. | 423/121 |
| 4,426,363 | 1/1984 | Yamada et al. | 423/121 |
| 4,994,244 | 2/1991 | Fulford et al. | 423/123 |

FOREIGN PATENT DOCUMENTS

| | | |
|---|---|---|
| 434281 | 3/1973 | Australia . |
| 1106750 | 12/1955 | France . |
| 2360514 | 3/1978 | France . |
| 830945 | 2/1952 | Germany . |
| 37-008257 | 7/1962 | Japan . |
| 48-37678 | 11/1973 | Japan . |
| 57-145029 | 9/1982 | Japan . |
| 62-230613 | 10/1987 | Japan . |
| 63-190709 | 8/1988 | Japan . |
| 700216 | 11/1953 | United Kingdom . |
| 1158048 | 7/1969 | United Kingdom ................. 423/122 |

OTHER PUBLICATIONS

"Ullmanns Encyklopadie der technischen Chemie", 4te Auflage' to E. Bartholome, 1974, no month pp. 308–311.
"Light Metals 1987" by PG Cousineau et al., Proceedings of the Technical Sessions sponsored by the TMS Light Metal Committee at the 116th Annual Meeting, Denver, CO, Feb. 24–26, 1987, pp. 11–17.

*Primary Examiner*—Steven Bos
*Attorney, Agent, or Firm*—Birch, Stewart, Kolasch & Birch, LLP

[57] ABSTRACT

A process for the production of aluminum hydroxide from an alumina-containing ore comprising, in a process for the production of aluminum hydroxide involving extraction of alumina from an alumina-containing ore by an aqueous alkaline solution, supplying a slurry containing the alumina-containing ore at a high solid content which is prepared from a small amount of an alkaline solution together with an aqueous alkaline solution which is so preheated to a temperature that a preheated temperature is enough high to have a temperature after the mixing with the slurry which is higher than an extraction temperature of alumina, simultaneously or after the mixing them, to an extraction apparatus comprising of a tube reactor, extracting alumina from the alumina-containing ore under extraction conditions of a temperature of 120°–160° C. and an extraction time within 10 minutes, separating dissolution residue from an extract solution immediately after the extraction, desilicating the extract solution, and adding seeds of aluminum hydroxide to the extract solution which is desilicated so as to precipitate aluminum hydroxide. By the production process, it is possible to economically produce aluminum hydroxide with little contamination by silica from the alumina-containing ore with a high content of the reactive silica.

13 Claims, 2 Drawing Sheets

PROCESS FOR PRODUCTION OF ALUMINUM HYDROXIDE FROM ORE CONTAINING ALUMINA

This application is a continuation of application Ser. No. 08/078,299, filed as PCT/JP92/01397, Oct. 29, 1992, published as WO93/09062, May 13, 1993, now abandoned.

FIELD OF THE INVENTION

The present invention relates to a process for the production of aluminum hydroxide from an ore containing alumina.

In more detail, the present invention relates to a process for the production of aluminum hydroxide, wherein aluminum hydroxide can be obtained economically with little loss of alkali, a high yield of alumina, low contamination by silica and a low unit cost of energy, from a low quality ore containing alumina (often referred to as bauxite hereafter) having a high content of soluble silica as a starting material.

PRIOR ART

A process which is most commonly employed for the production of aluminum hydroxide from bauxite is the Bayer process. This process comprises the following steps: Bauxite is treated with an alkaline solution such as an aqueous sodium hydroxide solution or an aqueous mixture solution of sodium hydroxide and sodium carbonate to obtain a slurry; alumina contained in the bauxite is extracted as sodium aluminate (extraction step); insoluble residues such as iron oxides, silicates and titanium oxides are separated from the slurry (red mud-separation step); seeds of aluminum hydroxide are added to a clear solution of sodium aluminate after the separation of the insoluble residues to precipitate aluminum hydroxide at a temperature of 50°–70° C.; the precipitated aluminum hydroxide is separated from the sodium aluminate solution (separation step); and a portion of the separated aluminum hydroxide is recycled as the seeds and the remainder of the separated aluminum hydroxide is withdrawn as a product; the sodium aluminate solution after separation (often referred to as a decomposing solution) is recycled as is or after condensation for use in the bauxite-dissolving step.

Usually, bauxite contains an alkali-soluble silica (often referred to as a reactive silica or $R-SiO_2$), in an amount that is dependent upon where the bauxite is mined. Accordingly, in the above extraction step, the reactive silica contained in the bauxite is dissolved as well as the alumina component.

When an extract solution (sodium aluminate solution) containing the reactive silica dissolved therein is subjected to the precipitation step to obtain aluminum hydroxide, the silica in the solution is also precipitated with the aluminum hydroxide, which causes deterioration of the quality of the aluminum hydroxide that is obtained. Accordingly, the reactive silica in the extract solution is allowed to react with a portion of alumina and a portion of the alkaline solution before entering the precipitation step in a desilication step, so as to precipitate the reactive silica as sodalite or zeolite, which is alkali-insoluble and is removed and discarded together with the iron oxides, the titanium oxides and other insoluble substances that are separated in the following red mud-separation step.

Conventionally, in the most common practice, the residence time in the extraction step is relatively long, from 30 minutes to 6 hours, so as to achieve sufficient dissolution of the reactive silica and conversion of the dissolved reactive silica to desilication products before precipitation.

However, the above-described process is not economical, since the soluble silica in the extracted solution is converted to a desilication product by using a large amount of alumina and alkali, as described above.

Known processes for suppressing the loss of alkali caused by the reactive silica in bauxite include a process described in Japanese Patent Kokoku Publication No. 8257/1962, wherein bauxite having a high content of reactive silica can be used by selectively dissolving the alumina component by utilizing the difference in the dissolution rate into a caustic alkali or sodium aluminate solution of the alumina and the reactive silica, a process described in Japanese Patent Kokoku Publication No. 37678/1973, wherein the extraction residue is separated by using a synthetic high molecular weight coagulant to suppress dissolution of the reactive silica while allowing the alumina component to be dissolved sufficiently, and a process described in Japanese Patent Kokai Publication No. 230613/1987, wherein aluminum hydroxide is precipitated by extracting the alumina component in a tube reactor, immediately flash-cooling a mixture of the extract solution and the extraction residue, separating and removing the extraction residue, and desilicating the extract solution, from which sodium hydroxide is precipitated.

However, the process disclosed in Japanese Patent Kokoku Publication No. 8257/1962 uses two sorts of bauxite, one with a high content of the reactive silica and the other with a usual content of the reactive silica, and employs different conditions for the extraction of each bauxite. Therefore, the process cannot be used when bauxite with the usual content of the reactive silica or bauxite with the high content of the reactive silica is used alone.

The process of Japanese Patent Kokoku Publication No. 37678/1973 is excellent with regard to rapid separation of the extraction residue, but no detailed description of the extraction of alumina is given on how efficiently dissolution of reactive silica is suppressed. In addition, no process is disclosed to suppress decrease in the yield of alumina.

In Japanese Patent Kokai Publication No. 230613/1987, a process is disclosed wherein a mixture of the extract solution and the extraction residue is flash-cooled immediately after extraction so as to suppress the dissolution of the soluble silica from bauxite into the alkaline solution, the residue is separated off, and the extract solution is desilicated. However, heating in this process is carried out by directly injecting live steam into a mixing header and a tube reactor. In this case, an especially large evaporator is required for keeping a water balance in the system, and the process is not economical. When a mixed slurry comprising an aqueous alkaline solution, such as a recycled decomposing solution, and bauxite is heated to an extraction temperature by using recovered steam and live steam in the mixing header, dissolution of $R-SiO_2$ takes place even during the preheating before the extraction step, so that suppression of the dissolution of $R-SiO_2$ is insufficient. In addition, since the desilication is conducted after the flash-cooling at a low temperature of 80°–110° C., the reaction rate of the desilication is low and an extraordinarily large apparatus for desilication is required in order to avoid contamination of the aluminum hydroxide with silica.

In addition, when the extract solution is maintained for a long time in the desilication step to decrease the silica concentration, the alumina component in the extract solution is precipitated as aluminum hydroxide simultaneously, which is a disadvantage since the yield of alumina in the overall process is decreased, even when the alumina extraction ratio from bauxite is high.

SUMMARY OF THE INVENTION

In view of the above-described situation, the inventors of the present invention have made extensive studies for finding a process for the economical production of aluminum hydroxide from bauxite, wherein the amount of lost sodium hydroxide is decreased, the decrease in alumina yield is suppressed and aluminum hydroxide with little contamination by silica is precipitated, without an increase in energy cost.

Thus, the present invention provides a process for the production of aluminum hydroxide by extraction of alumina from an alumina-containing ore by an aqueous alkaline solution, that comprises supplying a slurry containing the alumina-containing ore at a high solids content and an alkaline solution together with an aqueous alkaline solution that is preheated to a temperature that is high enough to have a temperature after mixing with the slurry that is higher than the extraction temperature of alumina, or separately supplying the slurry containing the alumina-containing ore and the aqueous alkaline solution that is preheated to an extraction apparatus comprising a tube reactor, extracting alumina from the alumina-containing ore at a temperature of 120°–160° C. and an extraction time within 10 minutes, separating a dissolution residue from an extract solution immediately after the extraction, desilicating the extract solution, and adding seeds of aluminum hydroxide to the extract solution which is desilicated to precipitate aluminum hydroxide.

DETAILED DESCRIPTION OF THE INVENTION

Figure 1:
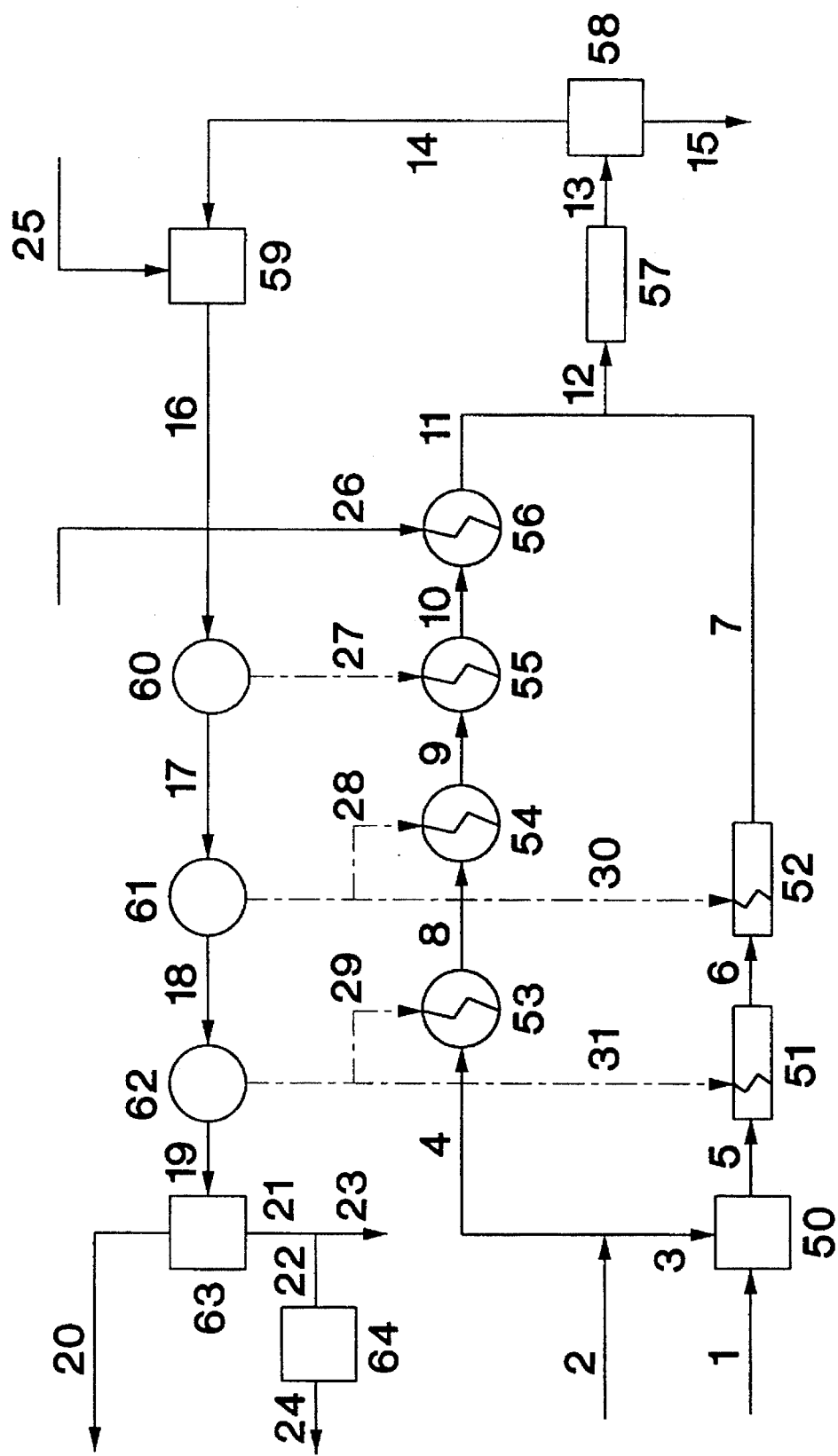
FIG. 1 shows a flow chart of an embodiment of the process of the present invention.

The alumina-containing ore to be employed as a raw material in the present invention includes bauxite, laterite and other ores which contains alumina, mainly in the form of alumina trihydrate (usually, the content of alumina trihydrate is higher than about 50% by weight, and preferably higher than about 70% by weight based on the total content of alumina in the ore,) and reactive silica.

There is no specific limitation on the content of reactive silica, but the content is usually from about 0.5% by weight to about 15% by weight, and is commonly from about 0.5% by weight to about 10% by weight based on the ore weight. When bauxite with a high content of the reactive silica is employed, the process of the present invention provides an economical advantage.

In practicing the process of the present invention, bauxite as the raw material, as is or after being roughly ground, is formed into a slurry, and is charged into a preheating apparatus as is or after being wet ground as desired.

A smaller particle size of bauxite to be charged into the preheating apparatus is more preferable so as to make the difference in dissolution rates of alumina and reactive silica greater. Since a larger particle size generally allows easier separation in a separation step of the extract solution from the dissolution residue, the particle size of bauxite is smaller than 10 mesh, and preferably smaller than 60 mesh.

The solid content of the slurry solution of bauxite is high enough to have a slurry that allows bauxite to be transferred, and depends on the type, particle size and other factors of bauxite. The solid content of the slurry is generally adjusted to be higher than about 20% by weight, and preferably in a range of 30 to 65% by weight.

There is no specific limitation on the solution to be used for the preparation of the slurry. The recycle solutions used in the Bayer process, such as a decomposing solution or its concentrate (often referred to as a recycled decomposing solution) and washing solutions of the dissolution residue and the precipitated aluminum hydroxide, may be employed. Particularly, the washing solution for the dissolution residue is more preferable because it has a lower $Na_2O$ concentration than that of the recycled decomposing solution, contains a small amount of the reactive silica dissolved therein, which works to suppress the dissolution of the reactive silica during preheating of the bauxite slurry, and because the reactive silica contained in the washing solution is removed by desilication in the following desilication step.

Depending on the type of bauxite, the $Na_2O$ concentration of the slurry and the type of preheating apparatus for the slurry, the upper limit of the temperature to which the bauxite slurry is preheated is about 120° C., and preferably about 110° C. When the preheating temperature is higher than 120° C., the reactive silica can be dissolved into the slurry during the preheating of the bauxite slurry.

Since the extraction of the reactive silica proceeds even during preheating of the bauxite slurry, the period required to preheat the slurry is set within 10 minutes and preferably within 5 minutes.

The preheating of the bauxite slurry is not necessarily required, but for the purpose of efficient utilization of heat recovered from the slurry after extraction, it is preferable to preheat the slurry to a temperature higher than about 70° C., and more preferably higher than about 80° C.

Usually, a preheating apparatus such as a double-tube heat exchanger or a shell-and-tube heat exchanger is used as the preheating apparatus for the bauxite slurry, since it allows little back mixing and preheats the slurry in a short time.

There is no specific limitation on the other aqueous alkaline solution which is mixed with the preheated bauxite slurry in the process of the present invention, and the recycled decomposing solution may be mainly used. In addition, an alkali-containing solution produced in other steps may be used as is or after condensation.

These aqueous alkaline solutions are generally preheated in a conventional manner so as to reach the desired extraction temperature after it is mixed with the bauxite slurry. For example, they are preheated to a temperature of 150° C. to 170° C. by using recovered or live steam.

As the preheating apparatus for the aqueous alkaline solution, indirect heating-type heat exchangers, such as a double-tube, a shell-and-tube and a spiral-type heat exchangers, may be employed.

The preheated bauxite slurry and the preheated aqueous alkaline solution are charged into an extraction apparatus separately or are charged into an extraction apparatus after being mixed together.

The mixing ratio of the preheated bauxite slurry to the preheated aqueous alkaline solution is dependent upon the type of bauxite, the solid content of the bauxite slurry and the composition of the decomposing solution. Ajustment is carried out so as to have a molar ratio of $Na_2O/Al_2O_3$ of the liquid at the exit of the extraction apparatus of 1.30–1.60 and preferably 1.35–1.50.

In the present invention, the slurry is brought to an intended extraction temperature at the entrance of the extraction apparatus.

When extraction at a higher temperature is desired, heating may comprise directly injecting some live steam into the preheated aqueous alkaline solution just before charging to the extracting apparatus, or into a mixed slurry when the bauxite slurry is mixed with the preheated aqueous alkaline solution just before charging to the extraction apparatus.

It is well-known that there are differences in the dissolution rates of alumina and reactive silica contained in bauxite and the formation rate of the desilication product in the aqueous alkaline solution, as described in Japanese Patent Kokoku Publication No. 8257/1962 and in Japanese Patent Kokai Publication No. 230613/1987.

Figure 3:
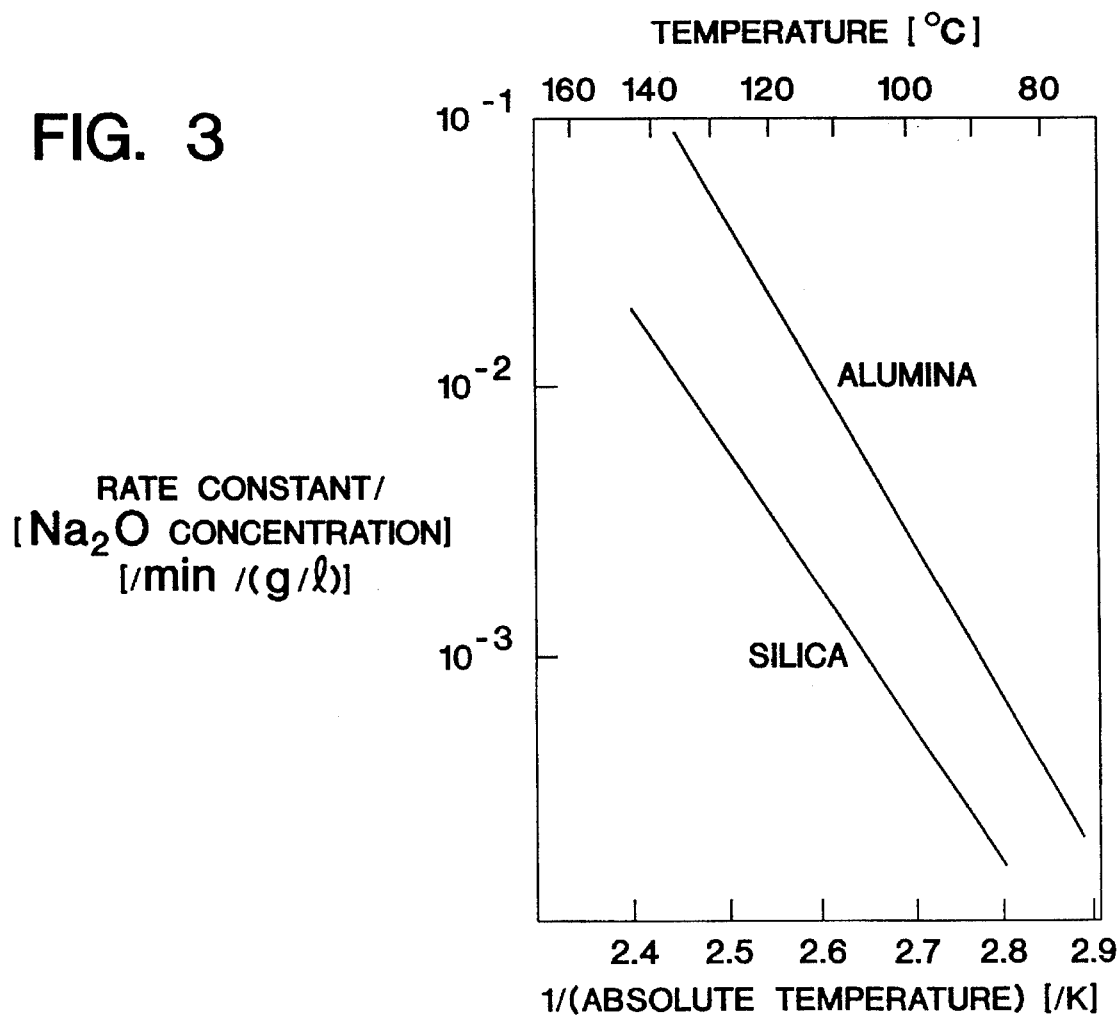
FIG. 3 shows the temperature dependency of the dissolution rate coefficients of alumina and reactive silica in bauxite into an aqueous alkaline solution.

In considering the extraction rates of alumina and reactive silica contained in bauxite in detail, it has been determined that the dissolving reaction rate of each component follows a first order reaction, and on a rate constant of the reaction as shown in FIG. 3, alumina shows a higher gradient of a rate constant of the reaction than that of reactive silica. Thus, when alumina is present in bauxite in the crystalline form of alumina trihydrate (gibbsite), the alumina trihydrate dissolves much faster than reactive silica so that it reaches solubility equilibrium faster, which is determined by the $Na_2O$ concentration and temperature; namely, at a given $Na_2O$ concentration, the extraction shows great temperature dependency. Accordingly, the present inventors have found that dissolving alumina extensively from bauxite while suppressing the dissolution of the reactive silica, and mixing the bauxite slurry and the aqueous alkaline solution at the entrance of the reactor, wherein the bauxite slurry and the aqueous alkaline solution have been preheated separately so as to raise the temperature of the mixture instantaneously to the temperature required for the dissolution of alumina, is more ideal than the conventionally practiced process, wherein an aqueous alkali solution is mixed with a slurry containing an alumina-containing ore at a high solid content, and the mixed slurry is heated to an extraction temperature.

The inventors have made extensive studies for finding a process that satisfies the above consideration and consequently completed the present invention, which comprises preheating, in a preheating apparatus using indirect heating, each of the bauxite slurry and the aqueous alkaline solution separately, mixing the preheated slurry and the preheated alkaline solution and then charging the mixture into the extraction apparatus, namely in the so-called binary fluid mode, and maintaining the preheating temperature of the bauxite slurry as low as possible to suppress the extraction of reactive silica but at a high enough temperature to allow partial recovery of the applied heat, while maintaining the preheating temperature of the aqueous alkaline solution, which has no effect upon the dissolution of silica in the bauxite slurry, high enough to allow a mixture of the preheated bauxite slurry and preheated aqueous alkaline solution to immediately reach the extraction temperature of alumina upon mixing.

When the aqueous alkaline solution can be heated to a sufficiently high temperature, the bauxite slurry may not be preheated.

As an extraction apparatus, an adiabatic tube reactor with little back mixing is employed. The shape of the reactor is not particularly limited. For example, it is possible to use a thermally insulated tube which transfers the mixture to the following separation step, so far as the binary fluid consisting of the preheated bauxite slurry and the preheated alkali solution is mixed.

The extraction apparatus is not required to have heat supplied thereto. It is recommended to raise the temperature of the slurry at the entrance of the apparatus sufficiently high so that the reaction can proceed without supplying additional heat to the reactor, with aid of thermal insulation, namely in an adiabatic manner.

This is to advantageously utilize the difference in the dissolution rates of alumina and silica into the alkaline solution. When the same quantity of heat is supplied during the same extraction time, it is more advantageous to have a high temperature at the entrance of the extraction apparatus and to allow the temperature to decrease from the entrance to the exit of the apparatus than to maintain the temperature of the slurry by supplying heat thereto.

In the extraction apparatus, omission of a heating means, especially one which can supply heat from the exterior thereof, eliminates reduction of the heat transfer rate due to scaling which induces a great problem when a tube reactor is employed, and is additionally effective in reducing scaling in an apparatus used for preheating the aqueous alkaline solution and the alkali-containing ore slurry.

The temperature and the time required for the extraction differ depending on the type and particle size of bauxite, the $Na_2O$ and $Al_2O_3$ concentrations in the alkaline solution and the molar ratio of the charged bauxite to the charged alkali. The most economical conditions are determined on the basis of unit costs of bauxite and caustic soda, costs of the apparatuses, performances of the separating apparatuses, efficiency of the desilication step and other factors. In general, the $Na_2O$ concentration in the extracting solution is about 100 g/l—about 160 g/l, the extraction temperature (the temperature at the exit of the extraction apparatus) at about 120° C.—about 160° C. and the extraction time within 10 minutes, and preferably the extraction temperature is set at about 125° C.—about 150° C. and the extraction time within 5 minutes. At a higher extraction temperature and a longer extraction time than the above conditions, the objects of the present invention, namely to increase the extraction ratio of alumina from bauxite, to suppress the dissolution of reactive silica and to decrease the loss of caustic soda, become difficult to achieve.

The conditions of the extraction step are therefore set so as to make the extraction ratio of alumina from bauxite as high as possible, while keeping the dissolution of reactive silica as small as possible. It is usual to set the conditions to obtain an extraction ratio of alumina of not lower than about 70%, and preferably not lower than about 80%, while maintaining the dissolution ratio of silica at not larger than about 70%, and preferably at not larger than 50%.

The slurry after the extraction of alumina is immediately transferred to a solid-liquid separation apparatus where it is divided into the extract solution (liquid) and the dissolution residue (solid). This solid-liquid separation is carried out at almost the same temperature as the extraction temperature.

Any solid-liquid separation apparatus may be used as the solid-liquid separation apparatus in the present invention, provided that residence times of the solid and the liquid, particularly that of the dissolution residue, are short and the volume of the extract solution entrained with the residue is small. In general, a high-speed separation-type thickener and a centrifuge (a decanter) may be employed.

In the separation step, it is possible to add a known coagulant, for example a polyacrylic acid-type high molecular weight coagulant, so that the separation of the slurry is accelerated. The amount of the coagulant added to the slurry may be in the known application range, and is usually at a ratio of about 0.005%—about 0.1% by weight based on the weight of the dissolution residue (on a dry basis).

It is necessary to carry out the separation in as short a time as possible, and is usually carried out within about 10 minutes, and preferably within about 5 minutes after the extraction. The separation time is the residence time of the dissolution residue in the separation apparatus.

It is understood that since the solid-liquid separation temperature in the present invention is nearly the same as the extraction temperature, a more rapid separation of the solid and the liquid is possible in comparison with the separation in the conventional process. A longer separation time is not desirable since it allows reactive silica to be dissolved from the residue.

The extract solution which has been separated in the solid-liquid separation step, as is or after indirect heating or cooling if desired, is transferred to a desilication reactor (desilication step). In the desilication step, the extract solution is charged into the desilication reactor as is or after adding seeds comprising a solid silicate substance as a major component if desired, so that silica dissolved in the extract solution reacts with a portion of alumina and a portion of alkaline solution, whereby silica is converted to an insoluble silicate substance such as sodalite and zeolite.

When a raw material of bauxite has a large content of reactive silica and thus the concentration of silica in the extract solution is higher than about 10 g/l, the desilication is initiated by nuclei spontaneously formed, but for the purpose of shortening the desilication time and improving the solid-liquid separation of the desilicated product thus formed, it is desirable to add seeds of the solid silicate substance comprising sodalite or zeolite as a major component.

There is no specific limitation on the type of desilication reactor that may be used provided that it provides a sufficient residence time to precipitate the reactive silica from the extract solution as a desilication product. Preferably, a reactor equipped with a multi-stage agitator with little back mixing is employed.

The conditions of the desilication vary, depending on whether the heat-recovery step from the extract solution by, for example, flash evaporation is carried out before or after the desilication step, and cannot be simply fixed. However, the conditions are set at about 80° C.—about 160° C. for the desilication temperature, and about 15 minutes—about 10 hours for the treating time, and preferably at about 115° C.—about 160 ° C. for the temperature and about 15 minutes—about 5 hours for the time, and more preferably at about 120° C.—140° C. for the temperature and about 0.5–3 hours for the time. The higher the treating temperature, the faster the desilication rate and the smaller the amount of aluminum hydroxide precipitated during the desilication treatment. However, since the higher treating temperature requires a pressure apparatus, the conditions of the desilication are selected from an economical view point.

After the desilication treatment, the extract solution is cooled if desired, and the desilication product and the clear sodium aluminate solution are separated. The solution is transferred to a precipitation step of aluminum hydroxide.

Cooling of the extract solution is carried out by using a flash evaporator or an indirect heat exchanger. When the flash evaporator is used, flashed steam is used as recovered steam to preheat the bauxite slurry and the recycled decomposing solution. When the indirect heat exchanger is used, it is also used to preheat the bauxite slurry and the recycled decomposing solution.

In the process of the present invention, the cooling of the extract solution may be carried out either immediately after the separation of the extract solution from the dissolution residue or after the desilication treatment.

The separation of the desilication product from the extract solution may be carried out by using a thickener, a centrifuge or a filter, alone or optionally in combination thereof. When a portion of the separated desilication product is reused as the seeds in the desilication treatment, it is recommended to reactivate the seeds by processing such as grinding, sieving and washing, before recycling to the desilication step. Especially, it is noted that grinding the obtained desilication product by using, for example, a ball mill and using seeds satisfy the conditions described hereinafter, can greatly shorten the time required for the desilication treatment.

The desilication product used as seeds depends on the desilication temperature, the concentration of the soluble silica in the extract solution, the desilication time and other factors. A desilication product having an average particle size of about 1 µm—about 30 µm, and preferably about 5 µm—about 20 µm may usually be used as seeds, and the amount of seeds added may be from a range of about 5 g/l—about 150 g/l, and preferably from about 20 g/l—about 100 g/l.

On the other hand, the dissolution residue which has been separated in the solid-liquid separation step in the process of this invention is cooled and washed to recover the extract solution entrained with the dissolution residue. Cooling of the residue is carried out by using a flash evaporator or an indirect heat exchanger. The flashed steam from the flash evaporation is used as the recovered steam to preheat the bauxite slurry and the recycled decomposing solution, and the recovered heat in the indirect heat exchanger is also used to preheat the bauxite slurry and the recycled decomposing solution. There is no particular limitation on the type of apparatus to be used for washing and draining the dissolution residue. When residue with a high soda content is washed, a high-speed thickener, a centrifuge or a filter which can prevent $R-SiO_2$ from dissolving out from the residue during the washing may be used alone or optionally in combination thereof.

The present invention will be, hereinafter, described in detail with reference to the accompanying drawings, but the present invention is not limited by following description.

Figure 2:
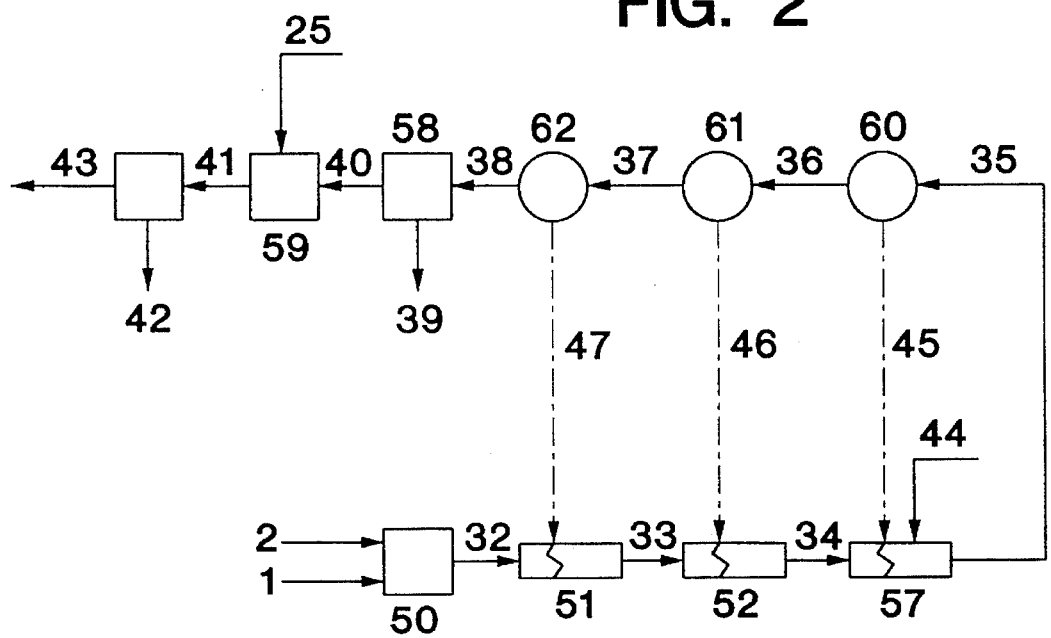
FIG. 2 shows a flow chart of an embodiment of the well-known Bayer process.

FIG. 1 shows a flow chart of an embodiment of the process of the present invention and FIG. 2 shows a flow chart of the conventional process known as the Bayer process. In the figures, numeral 50 stands for a slurry-preparation vessel comprising a ball mill, 51–55 for preheaters, 57 for an extraction apparatus, 58 for a solid-liquid separation apparatus, 59 for a desilication reaction vessel, 60–62 for flash evaporators for cooling, 63 for a solid-liquid separation apparatus, 64 for a grinder, 1 for a bauxite stream, 2 for a recycled decomposing solution stream and 3–47 for lines (conduits).

In FIG. 1, numeral 2 denotes the recycled decomposing solution, which is divided into lines 3 and 4. Bauxite is supplied through line 1 to the ball mill 50 and is ground and mixed in the ball mill, together with the recycled decomposing solution supplied through line 3 to prepare a transferrable slurry. Then, the slurry is transferred through line 5 into preheaters 51 and 52, each of which usually comprises a double tube heat exchanger, wherein heat is supplied from the flash evaporators for cooling 62 or 61 through lines 31 or 30, whereby the slurry is preheated to a desired temperature.

The main stream of the recycled decomposing solution through line 4 is transferred through lines 8, 9 and 10 into the preheaters 53, 54 and 55, each of which usually comprises a shell and tube heat exchanger, wherein heat is supplied from the flash evaporators for cooling 62, 61 or 60 through lines 29, 28 or 27, whereby the stream is preheated. Then, the stream is transferred through line 10 into the preheater 56, which usually comprises a shell and tube heat exchanger, wherein heat is supplied by live steam through line 26, whereby the stream is further preheated. A portion of live steam through line 26 may be fed directly into the decomposing solution, but it is preferable to use indirect heating in the preheater 56 since the water balance in the system is maintained, the amount of steam consumed is decreased and the size of the evaporator is made small. The preheating temperature in the preheater 56 is not particularly limited, and the preheating is carried out to reach the desired extraction temperature of alumina when the solution is mixed with the bauxite-containing slurry through line 7 prior to entry into the extraction apparatus.

The preheated bauxite slurry and the preheated decomposing solution are transferred through lines 7 and 11, respectively, mixed together and supplied to the extraction apparatus 57 through line 12.

A tube reactor with little back mixing may be used as the extraction apparatus, and the extraction temperature is generally in a range of about 120° C.—about 160° C.

In the extraction apparatus 57, the slurry in which the alumina component in the ore has been extracted as sodium aluminate is withdrawn immediately through line 13 and fed into the solid-liquid separation apparatus 58 for the separation of the dissolution residue from the extract solution, so as to prevent the dissolution of silica from the dissolution residue into the extract solution.

Any known high molecular weight coagulant may be added to the slurry that is fed into the solid-liquid separation apparatus 58, at any point in line 13 for the purpose of improving separation efficiency.

The type of solid-liquid separation apparatus 58 is not specifically limited provided that the solid-liquid separation is carried out in as short a time as possible, and the residence time of the dissolution residue in the apparatus is usually within about 10 minutes. Usually, a high speed separation-type thickener or a centrifuge is employed.

The slurry fed into the solid-liquid separation apparatus 58 is divided into the dissolution residue (red mud) and the extract solution,-and the residue (red mud) is transferred through line 15 to a step to treat the dissolution residue, which is discharged from the step after the recovery of heat and alkali.

On the other hand, the extract solution is introduced into the desilication reactor 59 through line 14, where it is held until a desired amount of the silica component dissolved in the extract solution is converted to the desilication product. As the desilication reactor 59, a tank equipped with an agitating means is generally used. In the desilication treatment, a solid silicate substance is added as the seeds through line 25 for the purpose of accelerating the reaction. As the seeds, a solid silicate substance commercially available may be fed from outside of the process, but generally the desilication product that is separated in the following step is recycled and used as is or after an activating treatment such as washing and grinding. The treatment temperature in the desilication reactor 59 is in a range of about 115° C.—about 160° C. and the treatment time is about 15 minutes—about 5 hours, and preferably the temperature is about 120° C.—about 140° C. and the time is about 0.5 hour—about 3 hours. An average particle size of the desilication product to be used as the seeds is about 1 μm—about 30 μm and an amount to be added is about 5 g/l—about 150 g/l.

In the desilication reactor 59, silica dissolved in the extract solution is precipitated as the desilication product, so that an extract solution containing the desilication product and having a desired silica concentration is produced. Such an extract solution is withdrawn through line 16, passed to the flash evaporators for cooling 60, 61 and 62 through lines 17 and 18, cooled there and then transferred to the solid-liquid separation apparatus 63 through line 19 for separating of the desilication product from the extract solution.

The steam recovered in the flash evaporators for cooling 60, 61 and 62 is used for preheating the main stream of the recycled decomposing solution as described above, that is the aqueous alkaline solution, and the bauxite-containing slurry.

The slurry that is fed through line 19 into the solid-liquid separation apparatus 63 is divided into the desilication product and the clear extract solution (sodium aluminate solution) and the desilication product is recovered from line 23 through line 21.

Since the desilication product thus obtained contains a small amount of impurities such as iron oxides and titanium oxides, the desilication product is withdrawn from line 23 and can be used effectively for known applications such as catalysts and inorganic fillers. A portion of the desilication product is introduced into the grinder 64 to grind it to a desired particle size for reuse as the seeds in the desilication reactor 59.

The clear extract solution that has been separated in the solid-liquid separation apparatus 63 is transferred into a precipitation step (not shown) of aluminum hydroxide through line 20. The seeds are added to the extract solution for precipitating aluminum hydroxide, which is separated while the decomposing solution separated from aluminum hydroxide is recycled through line 2.

FIG. 2 shows one example of the conventional Bayer process for the extraction of alumina from bauxite. In FIG. 2, the recycled decomposing solution is introduced through line 2 into the slurry preparation vessel 50, in which bauxite introduced through line 1 is ground so that a slurry is formed before it is transferred to the preheaters 51 and 52 and then the extraction apparatus 57 through lines 32, 33 and 34. Heat recovered in the flash evaporators for cooling 62, 61 and 60 from the slurry after the extraction is supplied to the preheaters 51 and 52 and the extraction apparatus 57 through lines 47, 46 and 45 as in the case of FIG. 1. Live steam is also introduced into the extraction apparatus 57 through line 44, so that the slurry is heated to a desired temperature for the extraction of alumina, and thus alumina is extracted from bauxite. After the extraction treatment, the slurry is withdrawn through line 35 and subjected to heat recovery in the flash evaporators 60, 61 and 62. Then, the slurry is fed through line 38 into the solid-liquid separation apparatus 58 where it is divided into the extract solution and the dissolution residue. The extract solution is introduced to the desilication reactor 59 through line 40, and to the solid-liquid separation apparatus 63 through line 41 after the desilication treatment where the clear solution of sodium aluminate is separated from the desilication product. The desilication product is withdrawn from the system through line 42 and a portion thereof is recycled and used as the seeds.

In both FIGS. 1 and 2, definite numbers of the flash evaporator for cooling, the preheater of the decomposing solution and the preheater for the slurry are shown, but any desired numbers of these apparatuses may be actually employed.

EFFECTS OF THE INVENTION

According to the process of the present invention, the dissolution of the reactive silica can be markedly suppressed in comparison with the conventional process, without substantially lowering the extraction ratio of alumina when alumina is extracted from bauxite. It is therefore possible to greatly decrease the loss of caustic soda and alumina which is caused by the removal of the dissolved reactive silica in the form of a desilication product. By employing the binary fluid mode of indirect heating for preheating of the slurry and the process for the alumina extraction using the adiabatic reactor (reactor without a heating means), it is also possible to extensively decrease the loss of caustic soda and alumina without a decrease in the heat transfer rate due to scaling and without deterioration of the energy unit from evaporation and other processes required to maintain a water balance. Furthermore, when the desilication treatment is carried out immediately after the separation of the dissolution residue, namely when the desilication treatment is carried out at a high temperature before cooling the extract solution in the process of the present invention, a faster desilication rate in comparison with the conventional process is obtained. Therefore, the desilication apparatus can be made smaller and the amount of the precipitated alumina in the desilication step is decreased. Thus, the effect of remarkably suppressing the decrease in the yield of alumina can be expected.

Thus, according to the process of the present invention, there is provided the process for the economical production of aluminum hydroxide with little contamination by silica from an alumina-containing ore having a high content of the reactive silica. Therefore, the industrial value of the present invention is extremely great.

EXAMPLES

The process of the present invention will be, hereinafter, described in detail with reference to the Examples, but the process of the present invention is not limited by Examples given below.

EXAMPLE 1

By using the apparatuses shown in FIG. 1, alumina was extracted from bauxite having an analytical composition (in % by weight) as shown in Table 1.

TABLE 1

| T—$SiO_2$ | R—$SiO_2$ | T—$Al_2O_3$ | $Fe_2O_3$ | $TiO_2$ |
| --- | --- | --- | --- | --- |
| 5.5 | 4.1 | 50.3 | 14.6 | 2.0 |

Bauxite was fed through the line 1 and the recycled decomposing solution having concentrations of 152 g/l of $Na_2O$ and 82 g/l of $Al_2O_3$ was fed through the line 3 to the slurry preparation vessel 50 comprising a ball mill, to obtain a slurry having a bauxite content of 600 g/l, wherein the bauxite was ground. Then, the slurry of the ground bauxite was preheated from 70° C. to 95° C. at a temperature-increasing rate of 7° C./min., using the steam recovered from the slurry after extraction and supplied through the lines 31 and 30 in the double-tube heat exchangers 51 and 52 having a tube diameter of 25 mm and a tube length of 360 m (51+52), by passing the slurry at a flow rate of 1.7 m/sec. The preheating time of the slurry was 3.5 minutes.

On the other hand, the recycled decomposing solution through the line 4 was preheated to 104° C. by using the steam recovered from the slurry after extraction, which was supplied through the lines 29, 28 and 27. Furthermore, live steam was injected to the outer tube side of the double-tubes through the line 26 to preheat the solution to 160° C. by indirect heating.

The bauxite slurry leaving the double-tube heat exchanger 52 was introduced to the line 12 through the line 7 together with the recycled decomposing solution preheated in the shell-and-tube heat exchanger from the line 11 and the slurry and the solution were mixed. Then, the resultant mixed solution was fed into the extraction step 57 comprising the tube reactor having a tube diameter of 40 mm and a tube length of 290 m at a flow rate of 2.1 m/sec. where alumina was extracted adiabatically (without heating from the outside) in a short time.

The temperature of the slurry at the exit of the extraction step 57 was 130° C. and the extraction time was 2.3 minutes.

For the purpose of measuring the extraction ratio of alumina and the dissolution ratio of R-$SiO_2$ from bauxite, samples of the slurry were withdrawn from a sampling port at an exit of the extraction step 57, and quenched with a flasher, and the bauxite residue was immediately separated. Based on chemical analysis of the residue, the extraction ratio of $Al_2O_3$ and the dissolution ratio of R-$SiO_2$ were calculated. The results are shown in Table 2.

COMPARATIVE EXAMPLE 1

Using the apparatuses shown in FIG. 2, alumina was extracted with the same recycled decomposing solution and the same bauxite as in Example 1.

The recycled decomposing solution was added to bauxite to obtain a bauxite concentration in the slurry of 600 g/l, and the slurry was subjected to the grinding treatment in the ball mill to achieve a particle size of 60 mesh. The slurry of the ground bauxite was mixed with the rest of the recycled decomposing solution and heated from 70° C. to 130° C. at a temperature-increasing rate of 7° C./min. in the preheaters 51, 52 and the extraction apparatus 57, which comprised the double-tube heat exchangers having a tube diameter of 40 mm and a total tube length (51+52+57) of 1070 m, by using the recovered steam through the lines 47, 46 and 45 and live steam through the line 44 so that $Al_2O_3$ in bauxite was extracted. In the same manner as in Example 1, the extraction ratio of alumina and the dissolution ratio of R-$SiO_2$ from bauxite were calculated. The results are also shown in Table 2.

COMPARATIVE EXAMPLE 2

With the same process as in Comparative Example 1 except that the total length of tubes of the double-tube heat exchangers was 730 m so that the residence time of the slurry in the preheaters and reactors was 5.8 min. The extraction ratio of alumina and the dissolution ratio of R-$SiO_2$ from bauxite were calculated. The results are shown in Table 2.

COMPARATIVE EXAMPLE 3

The extraction was carried out in an autoclave for 60 minutes by using the same starting extraction solution, the same bauxite, the same amount of bauxite added and the same extraction temperature as in Example 1. The extraction ratio of alumina and the dissolution ratio of $R\text{-}SiO_2$ from bauxite in the slurry were calculated. The results are also shown in Table 2.

and then introduced into a precipitation step so that aluminum hydroxide was precipitated. The concentration of $R\text{-}SiO_2$ in the extract solution leaving the solid-liquid separator 63 was 0.6 g/l, which means that the desilication was carried out satisfactorily.

TABLE 2

|  | Extraction Temp. °C. | Extraction Time (min.) | Extraction Ratio of $Al_2O_3$, % Extracted | Extraction Ratio of $Al_2O_3$, % Effective | Extraction Ratio of $R\text{—}SiO_2$, % | Loss of $Na_2O$ |
|---|---|---|---|---|---|---|
| Example 1 | 130 | 3.5 + 2.3 | 91 | 88 | 40 | 27 |
| Comparative Example 1 | 130 | 8.5 | 92 | 88 | 47 | 31 |
| Comparative Example 2 | 130 | 5.8 | 89 | 85 | 45 | 31 |
| Comparative Example 3 | 140 | 60 | 96 | 88 | 100 | 67 |

The extraction time shown in the above table means the temperature-increasing time of the bauxite slurry and the residence time in the extraction apparatus to which the slurry was supplied.

"Extracted" in the column Extraction ratio of $Al_2O_3$ means the ratio of the extracted alumina at the exit of the extraction apparatus and "Effective" means the ratio of available alumina calculated by converting an amount of $R\text{-}SiO_2$ dissolved in the extract solution to an amount of the desilication product and subtracting the amount of alumina lost as the desilication product from "Extracted".

The amount of the loss of $Na_2O$ was obtained by converting an amount of $R\text{-}SiO_2$ dissolved out into the extract solution to an amount of the desilication product and by calculating an amount of soda lost therefrom, and the unit is $(kg/t\text{-}Al_2O_3)$.

EXAMPLE 2

The slurry leaving the tube reactor 57 of Example 1 was mixed with a high molecular weight coagulant at a ratio of 0.04% by weight based on the dissolution residue and then introduced into the high-speed thickener 58 so that the bauxite residue was immediately separated. The concentration of $R\text{-}SiO_2$ in the extract solution was 3 g/l.

The extract solution was fed into the desilication reactor 59, and the seeds of the desilication product of which average particle size had been beforehand adjusted to 10 μm were added in a ratio of 50 g/l, and desilication was carried out at a temperature of 126° C. for 120 minutes. The desilicated slurry was introduced into the flash evaporators 60–62 for cooling and cooled to a temperature of 100° C. with flashing, and the desilication product was separated in the gravity solid-liquid separator 63. A portion of the desilication product was taken out for reusing as the seeds, and added to the desilication reactor at a ratio of 50 g/l after adjusting the particle size in the ball mill 64. The rest of the desilication product was mixed with the bauxite residue which was separated in the high-speed thickener, withdrawn through the line 15 and cooled in a cooler (not shown), and the mixture was washed in a multi-stage counter current washer (not shown) so as to recover sodium aluminate attaching to the residue. The extract solution separated in the solid-liquid separator 63 was transferred into a clarifying filter (not shown) through the line 20 for clarifying filtration,

COMPARATIVE EXAMPLE 4

The slurry leaving the shell-and-tube reactor of in Comparative Example 1 was fed into the flash evaporators 60–62 and quenched to a temperature of 100° C. The same amount of the coagulant in Example 2 was added to the cooled slurry and the mixture was immediately divided into the extract solution and the bauxite residue in the high-speed thickener 58. The extract solution was introduced into the desilication reactor 59 and, the seeds of the desilication product, of which the average particle size was beforehand adjusted to 10 μm, were added to the extract solution in a ratio of 50 g/l. The desilication was carried out at a temperature of 100° C. for 750 minutes. Then, the extract solution after the desilication treatment was fed to the gravity solid-liquid separator 63 through the line 41 where the desilication product was separated. A portion of the product was taken out and recycled as the seeds to the desilication reactor 59 after the adjustment of the particle size. The rest of the desilication product was taken out through the line 42 and mixed with the bauxite which was separated in the high-speed thickener 58 and withdrawn through the line 39, and the resultant mixture was washed in a multi-stage counter current washer (not shown) for recovering sodium aluminate attaching to the residue. The extract solution separated in the solid-liquid separator 63 was introduced into a clarifying filter (not shown) through the line 43 for clarifying filtration, and fed into the precipitation step so that aluminum hydroxide was precipitated.

The concentration of $R\text{-}SiO_2$ in the extract solution leaving the solid-liquid separator 63 was 0.6 g/l, which indicates that the desilication was carried out satisfactorily. (In the above conventional process shown in FIG. 2, though the high-speed thickener was used as the solid-liquid separator 58 and the desilication product was activated by grinding in the ball mill, these are only for the reasonable comparison in the effects with Example 1, but not mean that, in the conventional process, the high-speed thickener has been employed as the solid-liquid separator 58 nor that the desilication product has been activated to make the seeds in the ball mill.)

The operation conditions in each step in Example 2 and Comparative Example 4 are shown in Table 3. The extraction ratio of $Al_2O_3$ and the dissolution ratio of $R\text{-}SiO_2$ calculated from the chemical analyses on the dissolution residue sampled from the exit of the tube reactor 57 and the bauxite residue sampled from the exit of the residue washer are shown in Table 4.

TABLE 3

|  | Example 2 | Comparative Example 4 |
|---|---|---|
| Bauxite Slurry: | | |
| Preheat temp. (°C.) | 70 → 95 | 70 → 130 |
| Extraction temp. (°C.) | 130 | 130 |
| Residence Time: | | |
| Preheat Part (min.) | 3.5 | 8.5 |
| Extract Step (min.) | 2.5 | 0 |
| Liquid Composition at Exit of Extraction Step: | | |
| $Na_2O$ (g/l) | 136 | 136 |
| $Al_2O_3$ (g/l) | 160 | 160 |
| $Na_2O/Al_2O_3$ (molar ratio) | 1.40 | 1.40 |
| $SiO_2$ (g/l) | 3 | 3 |
| Liquid Composition in Desilication Reactor: | | |
| $Na_2O$ (g/l) | 133 | 138 |
| $Al_2O_3$ (g/l) | 156 | 158 |
| $Na_2O/Al_2O_3$ (molar ratio) | 1.40 | 1.44 |
| $SiO_2$ (g/l) | 0.6 | 0.6 |
| Desilication Conditions: | | |
| Temperature (°C.) | 126 | 100 |
| Time (min.) | 120 | 750 |
| Amount of Seeds (g/l) | 50 | 50 |

TABLE 4

| Extraction and Dissolution Ratios | Example 2 | Comparative Example 4 |
|---|---|---|
| At Exit of Extraction Apparatus (alumina) (%) | 91 | 92 |
| At Exit of Multi-stage Counter-current Washer (alumina) (%) | 88 | 84 |
| At Exit of Extraction Apparatus ($R-SiO_2$) (%) | 40 | 47 |
| At Exit of Multi-stage Counter-current Washer ($R-SiO_2$) (%) | 45 | 52 |

Table 4 shows that the extraction ratio of alumina at the exit of the multi-stage counter current washer in Comparative Example 4 was smaller by 4% than that of Example 2. This is due to the loss of alumina caused by its precipitation in the desilication step.

EXAMPLE 3

In Example 2, a portion of the desilication product was ground in the ball mill 64 to reuse as the seeds and then recycled to the desilication reactor. The variation of the concentration of R-$SiO_2$ in the extract solution depending on the particle size of the seeds and recycling times was studied. The results are shown in Table 5.

COMPARATIVE EXAMPLE 5

In Example 2, a portion of the desilication product was reused as the seeds without grinding as in Example 3. The desilication product was recycled to the desilication reactor, and the variation of the concentration of R-$SiO_2$ in the extract solution depending on the particle size of the seeds and the recycling times was studied. The results are included in Table 5.

TABLE 5

| Recycle Time of Seeds | | Example 3 | Comparative Example 5 |
|---|---|---|---|
| 1 | Average Particle Size of Seeds (μm) | 10 | 11 |
| | Specific Surface Area ($m^2/g$) | 2 | 2 |
| | R—SiO R in Extract Solution (g/l) | 0.6 | 0.6 |
| 5 | Average Particle Size of Seeds (μm) | 10 | 14 |
| | Specific Surface Area ($m^2/g$) | 2 | 1.1 |
| | R—$SiO_2$ in Extract Solution (g/l) | 0.6 | 0.8 |
| 30 | Average Particle Size of Seeds (μm) | 10 | 35 |
| | Specific Surface Area ($m^2/g$) | 2 | 0.2 |
| | R—$SiO_2$ in Extract Solution (g/l) | 0.6 | 1.2 |

What is claimed is:

1. A process for producing aluminum hydroxide from an alumina-containing and reactive silica-containing ore which comprises the steps of:
   (a) (1) mixing said alumina-containing and reactive silica-containing ore with an alkaline solution to obtain a slurry having a solids content higher than 20% by weight, or (2) mixing said alumina-containing and reactive silica-containing ore with an alkaline solution to obtain a slurry having a solids content higher than 20% by weight and preheating said slurry of (2) at a temperature of 70°–120° C.,
   (b) supplying an alkaline slurry mixture of an aqueous alkaline solution that is preheated to a temperature of 120°–160° C. and said slurry obtained in step (a) to a tube reactor,
   (c) extracting alumina as sodium aluminate from said alkaline slurry mixture obtained in step (b) in said tube reactor at a temperature of 120°–160° C. and for an extraction time of no more than 10 minutes, at an extraction ratio of alumina of not less than about 70% and at a dissolution ratio of reactive silica of not greater than about 70%, to obtain a mixture of an extract solution of sodium aluminate and dissolution residues of reactive silica,
   (d) separating said dissolution residues from said mixture obtained in step (c), to obtain the extract solution,
   (e) desilicating said extract solution obtained in step (d) to obtain a mixture of a desilication product and a clear extract solution of sodium aluminate,
   (f) separating said desilication product from said mixture obtained in step (e), to obtain the clear extract solution, and
   (g) adding seeds of aluminum hydroxide to said clear extract solution to precipitate aluminum hydroxide.

2. The process according to claim 1, wherein 50% by weight or more of the total content of alumina in said alumina-containing and reactive silica-containing ore is alumina trihydrate.

3. The process according to claim 1, wherein said slurry obtained in step (a) is preheated to a temperature of 80°–110° C., prior to mixing with said aqueous alkaline solution in step (b).

4. The process according to claim 1, further comprising the step of:

(h) grinding said desilication product separated in step (f) to obtain a ground desilication product, and adding the ground desilication product obtained in step (h) to the extract solution obtained in step (d).

5. The process according to claim 1, wherein step (c) is carried out for no more than 5 minutes.

6. The process according to claim 1, wherein the extraction ratio of alumina is not less than about 80% and the dissolution ratio of the reactive silica is not greater than about 50%.

7. The process according to claim 1, wherein 70% by weight or more of the total content of alumina in said alumina-containing and reactive silica-containing ore is alumina trihydrate.

8. The process according to claim 1, wherein the content of reactive silica in said alumina-containing ore is from about 0.5 to 15% by weight based on the total weight of the ore.

9. The process according to claim 1, wherein the content of reactive silica in said alumina-containing ore is from about 0.5 to 10% by weight based on the total weight of the ore.

10. The process according to claim 1, wherein the solids content of the slurry is 30 to 65% by weight.

11. The process according to claim 1, wherein said extract solution is desilicated at a temperature of about 80° to 160° C. for about 15 minutes to 10 hours.

12. The process according to claim 1, wherein said extract solution is desilicated at a temperature of about 115° C. to 160° C. for about 15 minutes to 5 hours.

13. The process according to claim 1, wherein said extract solution is desilicated at a temperature of about 120° C. to 140° C. for about 0.5 to 3 hours.

\* \* \* \* \*